United States Patent [19]
Grant, Jr.

[11] Patent Number: 5,622,450
[45] Date of Patent: Apr. 22, 1997

[54] PRESSURE EXTRACTION PROCESS FOR REMOVING SOIL AND GROUNDWATER CONTAMINANTS

[76] Inventor: Richard P. Grant, Jr., 141 Gleneagle, Rockford, Mich. 49341

[21] Appl. No.: 410,225

[22] Filed: Mar. 24, 1995

[51] Int. Cl.$^6$ .................................................. E21B 36/00
[52] U.S. Cl. ............................................ 405/128; 166/269
[58] Field of Search ................................ 405/128, 258, 405/269; 166/242, 268, 269, 370

[56] References Cited

U.S. PATENT DOCUMENTS

| | | | |
|---|---|---|---|
| 3,630,573 | 12/1971 | Goddin, Jr. et al. | 166/269 X |
| 3,679,264 | 7/1972 | Van Huisen | 166/269 X |
| 3,822,748 | 7/1974 | Allen et al. | 166/269 |
| 4,183,407 | 1/1980 | Knopik . | |
| 4,323,122 | 4/1982 | Knopik . | |
| 4,640,355 | 2/1987 | Hong et al. | 166/268 |
| 4,886,119 | 12/1989 | Bernhardt et al. . | |
| 4,892,688 | 1/1990 | Bernhardt . | |
| 4,943,305 | 7/1990 | Bernhardt . | |
| 4,950,394 | 8/1990 | Bernhardt . | |
| 5,017,289 | 5/1991 | Ely et al. | 405/128 X |
| 5,050,676 | 9/1991 | Hess et al. . | |
| 5,071,550 | 12/1991 | Bernhardt . | |
| 5,082,053 | 1/1992 | Bernhardt . | |
| 5,095,975 | 3/1992 | Bernhardt . | |
| 5,114,497 | 5/1992 | Johnson et al. | 166/268 X |
| 5,116,163 | 5/1992 | Bernhardt . | |
| 5,143,606 | 9/1992 | Bernhardt . | |
| 5,143,607 | 9/1992 | Bernhardt . | |
| 5,147,535 | 9/1992 | Bernhardt . | |
| 5,171,103 | 12/1992 | Bernhardt . | |
| 5,171,104 | 12/1992 | Bernhardt . | |
| 5,172,764 | 12/1992 | Hajali et al. . | |
| 5,197,541 | 3/1993 | Hess et al. . | |
| 5,220,958 | 6/1993 | Bernhardt . | |
| 5,221,159 | 6/1993 | Billings et al. | 405/128 |
| 5,281,333 | 1/1994 | Bernhardt . | |
| 5,380,126 | 1/1995 | Bernhardt | 166/370 X |
| 5,400,858 | 3/1995 | Blanchard et al. | 166/370 |

OTHER PUBLICATIONS

"Subsurface Volatiliztion and Ventilation for VOC Contamination" by Timothy J. Mayotte, *The National Environmental Journal*, Nov./Dec. 1993.

*Primary Examiner*—Frank Tsay
*Attorney, Agent, or Firm*—Waters & Morse, P.C.

[57] ABSTRACT

A pressure extraction process for removal of underground contaminants from subsurface soil and groundwater comprises establishing a well through the unsaturated soil into the underlying groundwater unit, with the well including an exterior pipe having fluid permeable openings therein at a lower portion that extends above and below the groundwater surface. An interior pipe is provided inside the exterior pipe and has an inlet opening below the groundwater surface. Oxygen-containing gas is injected into the exterior pipe at a non-vacuum pressure. Preferably the pressure is sufficient to cause some of the gas to flow outwardly into the soil through the pipe openings. A gas pressure flow is established downwardly in the exterior pipe to the inlet of the interior pipe and then upwardly through the interior pipe and out of the well. The gas pressure in the exterior pipe is maintained at a sufficiently low level in comparison with the hydraulic pressure outside the well adjacent the inlet to the interior pipe that liquid is induced to flow into the exterior pipe and to the inlet of the interior pipe, whereby the liquid is conveyed up the interior pipe by the flowing gas. The gaseous-phase and liquid-phase components removed from the well are separated and treated to remove contaminants. The treated gas can then be reintroduced as pressurized gas in the exterior pipe of the well or discharged to atmosphere, and decontaminated water can be used or released to the groundwater or surface water.

24 Claims, 5 Drawing Sheets

PRESSURE EXTRACTION PROCESS FOR REMOVING SOIL AND GROUNDWATER CONTAMINANTS

BACKGROUND OF THE INVENTION

1. Field of the Invention

The present invention relates to the in situ removal of contaminants from subsurface soil and groundwater by the use of a pressure extraction process.

2. Description of Prior Art

Underground soil and water contamination is a serious problem, especially when the contamination can affect underground aquifers that are used for drinking water.

A typical underground soil structure of the type that is readily susceptible to subsurface contamination comprises a porous, unsaturated upper soil layer, called the "vadose zone", which extends downward from the surface of the ground. The vadose zone is often positioned over a layer of water-saturated soil, wherein the water and soil are called a "water-saturated zone". This in turn typically rests on a base of low-permeability material such as clay or bed rock. The base is also called an "aquitard". The water and soil volume encompassed in a zone of water-saturated soil is called a "groundwater unit" and the water in the saturated soil is called "groundwater". The top of the groundwater unit adjacent the vadose zone is called the "groundwater surface" or "water table". A groundwater unit that is sufficiently large to provide a source of drinking water is commonly referred to as a "aquifer". The area of the vadose zone immediately above the groundwater surface is called the "capillary fringe". This is an area of increased water concentration in comparison with the upper regions of the vadose zone.

Vapor and liquid pressure conditions underneath the surface of the ground are similar to those above ground, with underground soil typically acting as a porous framework that restrains but does not prevent vapor and liquid flow. Underground soil does not exert a substantial compressive force on underground vapors and liquids. The air or vapor pressure at the upper surface of a groundwater unit is approximately atmospheric pressure, which is zero psig or approximately 14.7 psia at sea level. Pressure levels increase with depth below the groundwater surface in substantially the same way as hydraulic pressure increases in relation to depth in any body of water.

Underground water usually tends to flow in a particular direction, which is referred to as "downgradient" or "down slope". This is comparable to "downstream" flow for surface water. A downgradient flow of contaminated groundwater causes contaminants associated with the water to be spread to areas other than the area of the initial spill. When the downgradient flow leads to fresh water wells that provide drinking water, contamination of population centers can result.

A number of substances, including organic compounds and inorganic compounds such as dissolved metals, can cause contamination. One of the more common groups of chemicals that can cause toxic contamination is called "volatile organic compounds" or VOC's. These include petroleum hydrocarbons (e.g., gasoline and other fuels) and chlorinated and hydrogenated aliphatics (e.g., solvents, degreasing agents and cleaning solutions). VOC's and other contaminants spilled on the surface of the ground tend to migrate downwardly through the soil under the influence of gravity and infiltration of water until the contaminants degrade or dissipate or until they come in contact with the groundwater surface. Petroleum hydrocarbons, which are generally of lower density than water, tend to spread out or float on the groundwater surface or become dissolved in the upper regions of the groundwater. Non-aqueous phase contaminants floating on groundwater are called "free product". VOC's and other contaminants that have a higher density than water, such as many chlorinated and hydrogenated aliphatics, tend to sink in the groundwater, becoming dissipated or dissolved in the groundwater as they penetrate through the groundwater.

VOC's and other contaminants contaminate the ground in several ways. They become sorbed on or in the grains of soil they contact; they are held in the soil structure in the voids between the grains of soil; they volatize and are held in the soil structure in vapor form; they dissolve in the groundwater; and they float on the groundwater or sink in the groundwater.

As additional fresh water infiltrates down through the soil from the surface of the ground, contaminants that had been suspended in the soil structure are contacted by the water and gradually become dissolved or entrained in the water. This provides a continuing and persistent source of contamination. Accordingly, it is desirable to remediate contamination in the vadose zone as well as on or in the groundwater.

A number of techniques have been used for removal of subsurface soil contaminants and for remediation of the affected soil and groundwater. One technique is excavation of the contaminated site and removal and treatment of the affected soil. This, however, can be extremely costly or infeasible with increasing depths below grade surface.

A number of techniques are used to treat the soil or groundwater in place (in situ). One method includes vacuum extraction of free product contaminants floating on the groundwater surface. Vacuum extraction techniques also are used to volatize contaminants and remove vapors from the vadose zone soil structure above the groundwater.

Vacuum extraction processes which reduce the soil vapor pressure in proximity to the groundwater surface have been shown to cause upwelling of the groundwater surface proportional to the level of vacuum applied. The upwelling frequently saturates vadose zone and capillary zone soils, and makes that submerged area less accessible to volatilization and aerobic degradation of contaminants.

A technique known as "sparging" is frequently used in conjunction with soil vacuum extraction and involves injecting oxygen-containing gas below the groundwater surface and vacuum extraction of gas from vadose zone soils.

Another contamination removal process that has had some success employs vacuum extraction for removal of volatile contaminants from the vadose zone and contaminated groundwater. One system employing this process employs a high-vacuum extraction well comprising a perforated outer well casing that extends below the groundwater surface and a high-vacuum interior pipe that draws liquid and vapor into the outer casing from above and below the groundwater surface and expels the liquid and vapor by vacuum extraction out of the inner pipe. This process has been commercialized by Xerox Corporation.

There are some drawbacks to this system. The use of a high level of vacuum to extract vapors from the vadose zone and from the capillary fringe creates a reduced pressure zone outside of the well casing above the groundwater surface. This reduced pressure can change the contours of the groundwater surface adjacent the well casing in the manner described above for vapor vacuum extraction systems. The vacuum extraction of groundwater may depress the groundwater surface in the immediate proximity to the well casing, but the reduced pressure in the vadose zone above the groundwater surface at least partially offsets this effect by urging the groundwater upwardly. There is a concern that the vacuum that induces upwelling could, under some circumstances, exceed the depression effect caused by groundwater extraction, in which case the groundwater would actually rise to form a raised collar or bulge in the groundwater surface around the well casing (see FIG. 3). The outer surface of a raised collar would slope away from the well casing and would thus urge free product floating on the groundwater outside of the collar to flow away from the extraction well. Raising the groundwater level also submerges an area of the vadose zone and capillary fringe and makes that submerged area less accessible to volatilization of contaminants.

An object of the present invention is to provide a better method for in situ removal of subsurface contaminants.

SUMMARY OF THE INVENTION

The present invention is a more effective process for removal, including extraction and degradation, of underground contaminants from a soil area that includes a subsurface groundwater unit and a vadose zone above the groundwater unit. The present invention comprises providing a well that extends downwardly from grade surface to below the groundwater surface, the well including an exterior pipe with fluid permeable openings therein at a lower portion that extends below the normal groundwater surface; providing an interior pipe inside the exterior pipe, the interior pipe having an inlet opening at a lower end below the normal groundwater surface; introducing gas in the exterior pipe, at a pressure that is sufficient to create a gas communication between the exterior and interior pipes through the inlet at the lower end of the interior pipe; maintaining a gas flow downwardly at a non-vacuum pressure in the exterior pipe and then upwardly in the interior pipe such that gas is not withdrawn from the vadose zone into the exterior pipe; and maintaining a gas pressure differential between the exterior and interior pipes that induces groundwater to flow into the exterior pipe adjacent the lower end of the interior pipe and thereafter be extracted by the gas flowing into the interior pipe.

After an initial extraction of high-concentration contaminants with a gas flow at a pressure as low as atmospheric pressure, pressure is increased in the exterior pipe. The pressurized gas introduced into the well flows outwardly into the unsaturated soil and causes the soil to be permeated with oxygen-containing gas. The pressurized gas also augments the effect of groundwater removal in depressing the groundwater surface for a wide area around the well, creating a larger unsaturated zone or vadose zone for volatilization and also creating a downwardly sloping groundwater surface leading toward the lower portion of the well. Liquid contaminants thus flow toward the well under the influence of gravity. The outward flow of oxygenated gas into the enlarged subsurface area of unsaturated soil promotes aerobic decomposition of contaminants while at the same time serving to vaporize volatile components of the contaminants. The vaporized components are typically degraded in situ by indigenous soil microorganisms, or can be removed by one or a combination of the interior pipe, by a separate upper section of the exterior pipe, or by separate vent wells spaced apart from the pressure extraction well. Gas flow, at pressure, through the soil also serves to dislodge contaminants trapped in the soil structure and increase the soil permeability.

Components which are removed from the well by the pressure extraction process are separated and treated to remove contaminants from the air and water. The treated gas can then be reintroduced as pressurized gas in the exterior pipe of the well or discharged to atmosphere, and decontaminated water can be used, released to the groundwater or to a surface water body.

These and other features and advantages of the present invention are described in more detail in connection with a preferred embodiment of the present invention which is described below and shown in the appended drawings.

DETAILED DESCRIPTION OF PREFERRED EMBODIMENTS

Figure 1:
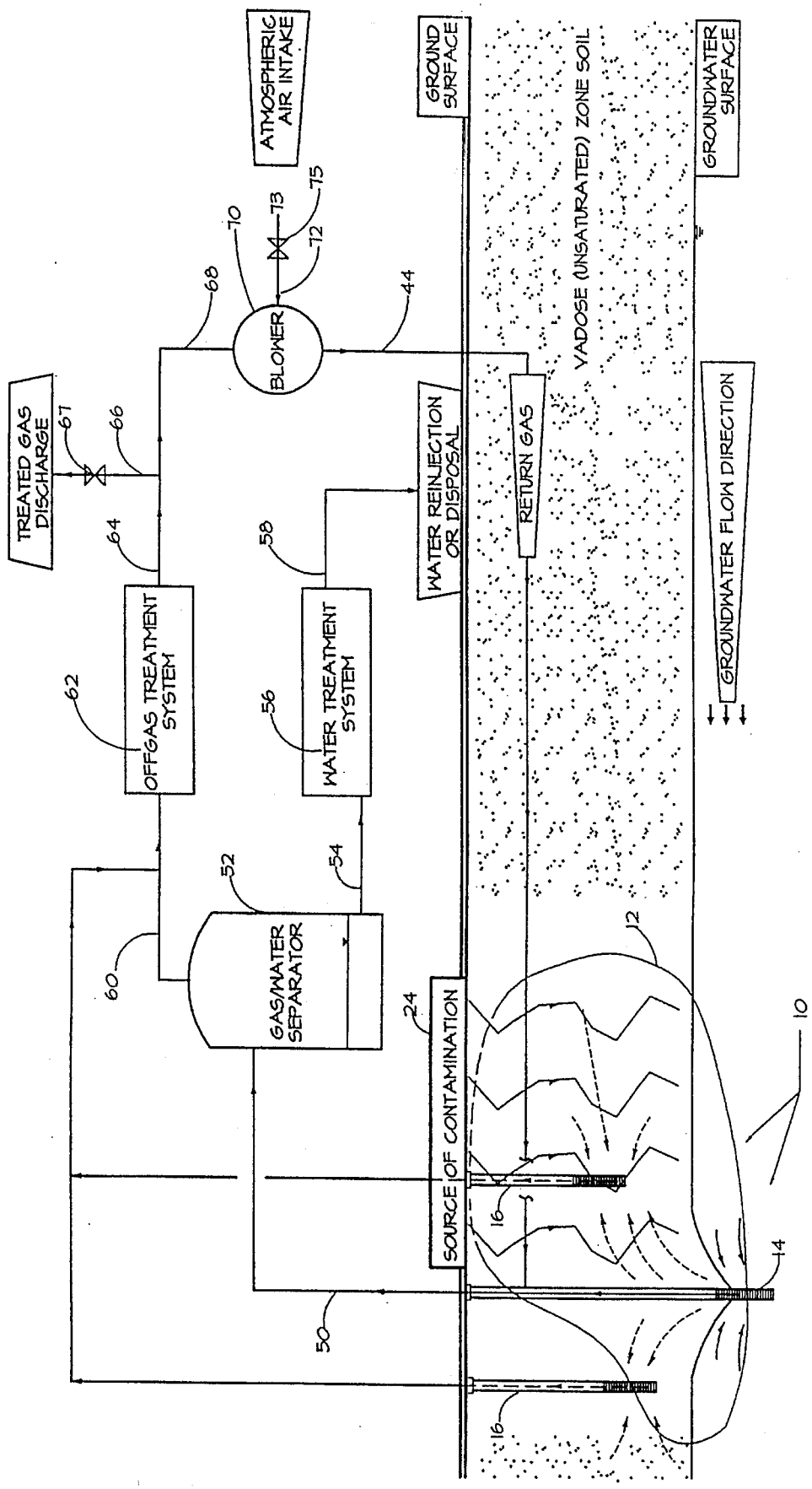
FIG. 1 is a schematic side elevational view of a contaminant treatment system employing the process of the present invention.

Referring now to the drawings, a system 10 constructed for the purpose of treating in situ underground contaminated soil 12 comprises at least one pressure extraction well 14 located in an area of contaminated soil. The present invention is effective on a number of contaminants, including organic compounds and dissolved metals. The process is especially effective in removal of volatile organic compounds (VOC's) which tend to float on the groundwater surface or are dissolved in the groundwater and are subject at least in part to vaporization for removal of the components from subsurface soils. The present invention can also employ separated vent wells 16 employing vertical vent pipes as well as vent wells 18 employing horizontal vents 104 (see FIG. 4). A source of contamination 24 is indicated schematically above the treatment area.

Figure 2:
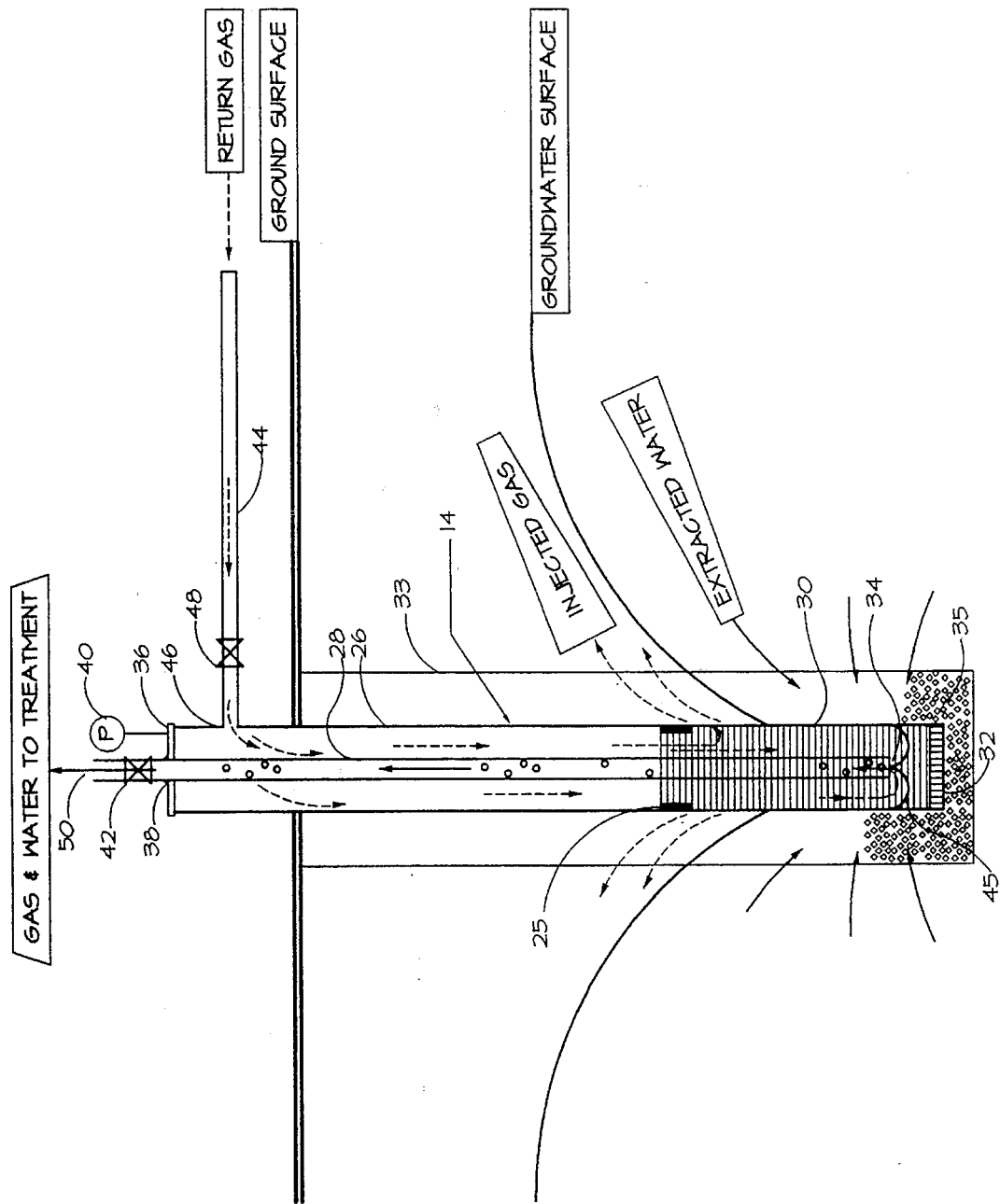
FIG. 2 is a side elevational view of a pressure extraction well operating in accordance with the process of the present invention.

Referring to FIG. 2, pressure extraction well 14 comprises an exterior pipe 26 and an interior pipe 28. The exterior pipe is installed in a borehole 33, which may be backfilled with granular media 35. Only a portion of the granular media is shown in FIG. 2. Generally, the backfill media fills the bore hole. Exterior pipe 26 has a plurality of gas and liquid-permeable openings 30 in the exterior surface of the exterior pipe extending upwardly from the bottom thereof. The bottom of the pipe is enclosed with a solid or screened cap 32. The permeable openings 30 desirably are circumferentially extending slots in the exterior portion of the pipe and spaced axially along the pipe. The slots should be sufficiently small to prevent infiltration of substantial amounts of soil or granular backfill media into the pipe, although the positive pressure applied to the interior of the exterior pipe will minimize the potential for soil infiltration into the pipe.

Desirably the slots of the openings 30 should be between 0.005" and 0.05" in width and preferably 0.01".

Openings 30 in the lower portion of exterior pipe 26 extend from the bottom of the pipe upwardly to a position preferably near or above the normal or static groundwater surface prior to application of pressure to the pipe. The openings should extend high enough so that gas will be injected at least in part into the enlarged vadose zone that is created around the well as a result of groundwater extraction and gas injection. The openings preferably do not extend a large distance above the groundwater surface. Otherwise, at least in certain soil conditions, there can be excessive gas flow into the vadose zone. This can reduce excessively the pressure in the exterior pipe and the amount of air available to flow up the interior pipe.

If desired, the quantity of usable openings can be adjusted by a blocking device 25 shown in FIG. 2, which comprises a C-shaped sleeve slidably mounted in the exterior pipe. The sleeve can be connected to an adjustment rod that extends near the surface of the ground, where the rod can be manipulated to lower the sleeve to block selected openings. Blocking devices of this type and other types of blocking devices are conventional.

The lower end of the pipe should extend into the groundwater. The specific depth of penetration varies depending upon the depth of penetration of contaminants into the groundwater. This depth could be as little as one foot below the normal groundwater surface for contaminants that are contained in the uppermost regions of the groundwater; alternatively the depth could be as great as one hundred (100) feet or possibly more for contaminants that sink in the groundwater. Exterior pipe 26 is desirably formed of polyvinylchloride (PVC), with a nominal inside diameter of 4 or 6 inches in the preferred practice of the present invention. Other types of pipe, such as steel, will work.

Interior pipe 28 extends downwardly through the interior of exterior pipe 26 and terminates at an inlet formed by an open lower end 34 positioned below the normal groundwater surface and above the bottom of the exterior pipe. In the preferred practice of the present invention, interior pipe 28 is a PVC pipe and has a nominal inside diameter of one inch to attain conveying velocity.

The upper end of exterior pipe 26 is fitted with a sealed cap 36, with interior pipe 28 being welded in an opening 38 in the cap. A pressure gauge 40 at the upper end of the exterior pipe measures pressure at that location, and an adjustable valve 42 in the outlet of interior pipe 28 is adjustable to vary the back-pressure in pipe 28. A pressurized air conduit 44 for return air or other pressurized gas leads to an inlet 46 in the upper portion of exterior pipe 26. An adjustable valve 48 is used to vary the gas pressure and gas flow rate inside exterior pipe 26.

In the practice of the present invention, the air pressure at inlet 46 of exterior pipe 26 is 0 to 40 psig and preferably 0 to 20 psig. The pressure should be less than or approximating the hydraulic head pressure present in the groundwater unit adjacent to the exterior pipe at the level of the interior pipe inlet. For a typical well that extends about ten feet below the groundwater surface, an exterior pipe pressure of 0 to 4 psig is desired. The pressure of the air in the exterior pipe at the position of the openings 30 adjacent the vadose zone (either the original vadose zone or the enlarged vadose zone due to pressure depression of the groundwater level to form a cone of depression adjacent the exterior pipe) should be sufficient that the gas pressure inside the pipe at least equals, and preferably exceeds the soil gas pressure outside the pipe, so that the gas permeates the soil and vents the soil with oxygenated gas. Groundwater which surrounds the exterior pipe openings 30 is under a hydraulic pressure head corresponding to approximately one psig for every 2.303 feet of liquid depth. When the gas pressure inside the exterior pipe 26 exceeds the hydraulic head pressure of a specific groundwater depth, water will not enter the exterior pipe openings 30 at that depth. Water which surrounds the exterior pipe openings beneath that depth will possess sufficient pressure to infiltrate into the exterior pipe. In the present invention, to allow liquid withdrawal through the interior pipe, the gas pressure in the exterior pipe below the groundwater level is maintained at a low enough level that it will not prevent the water in the saturated soil from infiltrating the pipe openings 30 adjacent to the inlet 34 to the interior pipe. The pressure inside the interior pipe 28 is less than that inside the exterior pipe 26. Thus, gas and liquid can pass from exterior pipe to the interior pipe. As the gas exits the exterior pipe through the inlet opening 34 in interior pipe 28, the gas flows rapidly over the surface of the liquid 45 adjacent inlet 34, as shown in FIG. 2. This gas entrains the liquid in particles or droplets into the interior pipe 28. The gas carries the liquid droplets through valve 42 at the top of the inlet pipe.

Referring to FIG. 1 again, liquid (water and any free product) and vapor extracted through outlet 50 is conveyed to an air/water separator 52 where the liquid and gas are separated. The liquid is then transmitted through conduit 54 to a water treatment system 56 of conventional design wherein contaminants are removed from the water and the water is returned via conduit 58 to a suitable use or disposal destination. The water can either be used, reintroduced to the groundwater system, or disposed in a surface water body.

Gas separated from the liquid in separator 52 is conveyed by conduit 60 to a gas treatment system 62 of conventional design, wherein volatized contaminants are removed from the gas. Treated gas is conveyed from the treatment system by conduit 64 and is either discharged to atmosphere through a vent 66 controlled by valve 67 or is directed by a conduit 68 that returns the gas to pipe 44 which leads to the exterior pipe of the pressure extraction well. A blower 70 increases the pressure of the return air and can supplement the return air with fresh air through a conduit 72 controlled by valve 75. Adjustments to the blower or to valves 42, 48, 67, and 75 can be made to achieve the proper oxygen concentration, proper interior pipe pressure and pressure differential between the interior and the exterior pipes in order to provide the proper pressure and fluid and air discharge in the present invention.

The pressure in exterior pipe 26 should be at least atmospheric pressure or slightly greater than soil gas pressure at the vadose zone openings 30 in the exterior pipe. The pressure could be as high as 20 to 40 psig at this position in the pipe. The selection of pressure depends on the soil condition and depth of well necessary at the site for contaminant remediation, as discussed below. The pressure differential between the exterior and interior pipes adjacent valves 42 and 48 should be as low as possible, preferably one psig or lower. The pressure differential could be as high as 40 psig.

In operation, the extraction well is first established to a level below the groundwater surface. Before the extraction operation is commenced, hydraulic pressure in the groundwater causes water to infiltrate the exterior pipe and cover the inlet to the interior pipe. At start up, the pressure in the exterior pipe is first raised to the point where the water covering the inlet of the interior pipe is expelled and gas communication and flow is established between the exterior and interior pipes. Once gas communication is established the gas pressure drops as gas flows from the exterior pipe into the interior pipe. Once gas flow is established, it is generally desirable to first operate the system at a lower pressure, such as atmospheric pressure, in order to maximize removal of high-concentration liquid contaminants near the groundwater surface. The lower pressure in the exterior pipe causes a higher rate of liquid infiltration into the exterior pipe resulting from hydraulic head pressure. The initial pressure desirably is atmospheric pressure, but it could be higher than atmospheric pressure. A separate liquid pump in the well or in a separate well near the pressure extraction well also can be employed to provide or augment initial liquid removal.

Initial operation tends to lower the groundwater surface somewhat in the immediate vicinity of the well, which initiates creation of an expanded vadose zone in a cone of depression around the well. The slope and depth of the cone of depression depends on the permeability of the soil and the rate of groundwater extraction, the slope of the cone being steeper where the soil is less permeable and water flow through the soil is retarded.

After initial reduction of groundwater contaminant concentration has stabilized, pressure in the exterior pipe is gradually increased. This causes pressurized gas to enter the vadose zone (as it may have been expanded during initial operation), oxygenating the soil and increasing soil gas pressure. The soil gas pressure depresses the groundwater surface in a gradually enlarging cone of depression around the extraction well, producing a further enlarged vadose zone for oxygen infiltration around the well. Lower permeability soils may require a higher gas pressure (or a longer period of application) than high permeability soils, in order to depress the groundwater surface in the cone of depression around the well. As long as the system is used for simultaneous groundwater extraction, the maximum gas pressure in the exterior pipe should be maintained at a low enough level that groundwater will infiltrate the exterior pipe and flow to the inlet of the interior pipe, where the flowing gas will convey the liquid up the interior pipe. If the gas pressure is too high, the gas blows the liquid out of the exterior pipe to a level below the interior pipe inlet, which will stop liquid conveyance up the interior pipe. A maximum gas pressure that does not exceed the hydraulic head pressure in the groundwater at the level of the interior pipe inlet provides continued removal of liquid from the groundwater surface during gas injection of the vadose zone.

In a remediation operation a test is first conducted to find out the soil conditions and how deep the contaminants have penetrated. Then the remediation parameters are established accordingly. As an example, if the contaminants are VOC's that are contained in the vadose zone and the upper ten feet of the groundwater, the well might extend ten feet or somewhat further below the groundwater surface. After initial operation at atmospheric pressure the groundwater surface at the well could be reduced by about five feet, leaving a hydraulic head pressure at the bottom of the well of about five feet, which translates to a head pressure at the interior pipe inlet at the bottom of the well of about 2.2 psig. Pressure in the well is then increased gradually to this level or somewhat less. This depresses the groundwater surface to the vertical depth of the contaminants while expanding the radius of the cone of depression outwardly, while still permitting groundwater extraction from the well. Thus, liquids in the contaminated zone are evacuated and the contaminated soil is exposed to remediation by oxygenation and gas injection.

In an exemplary site wherein contaminants heavier than water penetrate as far as forty feet (or perhaps further) into the groundwater unit, an ultimate pressure of about 17 psig or so can be required to lower the groundwater surface to a level below the depth of contaminant penetration. Low permeability soils may require more pressure or a longer period of application to depress the groundwater surface and expand the cone of depression.

In most operations involving VOC's, a maximum pressure in the exterior pipe of about two psig is sufficient for remediation. Some remediation operations could require a maximum pressure of twenty (20) to forty (40) psig or possibly higher, depending on well depth and soil permeability.

The pressure in the interior pipe is selected in relation to the pressure in the exterior pipe. The interior pipe pressure should be at least 0.5 psig less than the exterior pipe pressure to induce gas flow from the exterior to the interior pipe. The pressure differential could be higher. In an operation where the exterior pipe pressure is five psig (measured at the inlet at ground level), the desirable interior pipe pressure (measure at the outlet at ground level) could be about two psig. A lower gas pressure differential is preferred where feasible.

Figure 5:
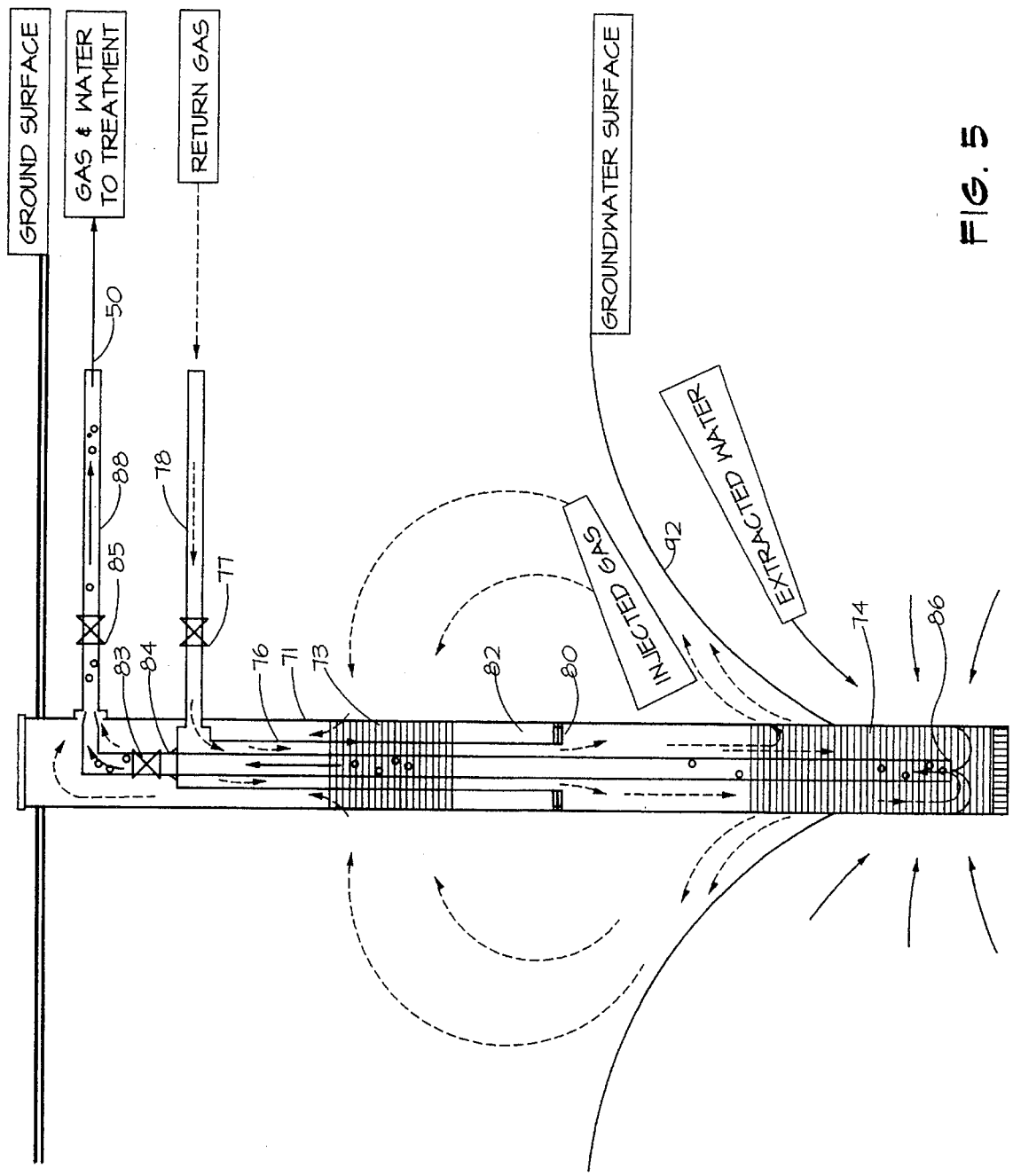
FIG. 5 is a schematic side elevational view showing an alternative embodiment of a pressure extraction well constructed in accordance with the present invention.

Another embodiment of the present invention is shown in FIG. 5. In this embodiment, an exterior pipe 71 includes fluid permeable openings 73 of the same type as described above at an upper portion of the pipe as well as fluid permeable openings 74 at a lower portion of the pipe, with the pipe being non-permeable between the openings. The fluid-permeable openings at the lower portion of the pipe are the same type as discussed above and extend below (and may extend above) the normal groundwater surface. A gas inlet pipe 76 inside the exterior pipe 71 conveys pressurized gas (which may comprise return air) from an inlet pipe 78 downwardly in the interior of exterior pipe 71. A radial seal 80 seals the space between the outer surface of pipe 76 and the interior surface of pipe 71 so that pressurized gas introduced into pipe 76 flows into and downwardly through pipe 71 but cannot flow upwardly through space 82 above seal 80.

Another interior pipe 84 fits inside pipe 76 and extends to an open lower end 86 near the bottom of pipe 71. Pipe 84 serves the same function as interior pipe 28 of FIG. 2. An outlet pipe 88 provides an outlet to the upper end of pipe 71 as well as the upper end of pipe 84 for conveying gas and liquid to a treatment location.

The operation of this embodiment is as follows: Pressurized gas (e.g., return air) introduced through pipe 78 flows past seal 80 into the lower portion of pipe 71, wherein the gas passes out of openings 74 and into the unsaturated ground. This increases the soil gas pressure and, together with the extraction of groundwater, contributes to the depression of the groundwater surface contour similar to the shape 92 shown in FIG. 5. Injected gas emanating from openings 74 above the new groundwater surface contour serves to vent the soil and volatilize the volatile contaminants above the new groundwater surface and in the vadose zone soil. This vented gas conveys vaporized and entrained liquid contaminants from the vadose zone soil into vent opening 73 and into the upper portion of pipe 71. This gas is then conveyed under slight vacuum upwardly to outlet pipe 88 and conveyed to the air and water treatment equipment of FIG. 1.

Gas flowing downwardly through pipe 71 that does not pass outwardly through openings 74 entrains water and liquid contaminants in the lower end of pipe 71 and conveys the liquid upwardly through opening 86 and the interior of pipe 84, carrying with it any contaminants that are floating on the surface of the groundwater. The sloped groundwater surface 92 serves to urge the contaminants to flow downwardly to the extraction well where they are volatilized and carried as droplets, vapor or mist upwardly through interior pipe 84 to outlet pipe 88, which also goes to the gas and water treatment equipment. Valve 85 is throttled to adjust the gas withdrawal flow and vacuum level such that a slight vacuum exists at the upper end of pipe 71.

The advantage of the embodiment of FIG. 5 is that, where soil venting is required to collect volatilized contaminants, vent gas can be removed from the system in the same conduit, and separate vent wells are not required.

Figure 4:
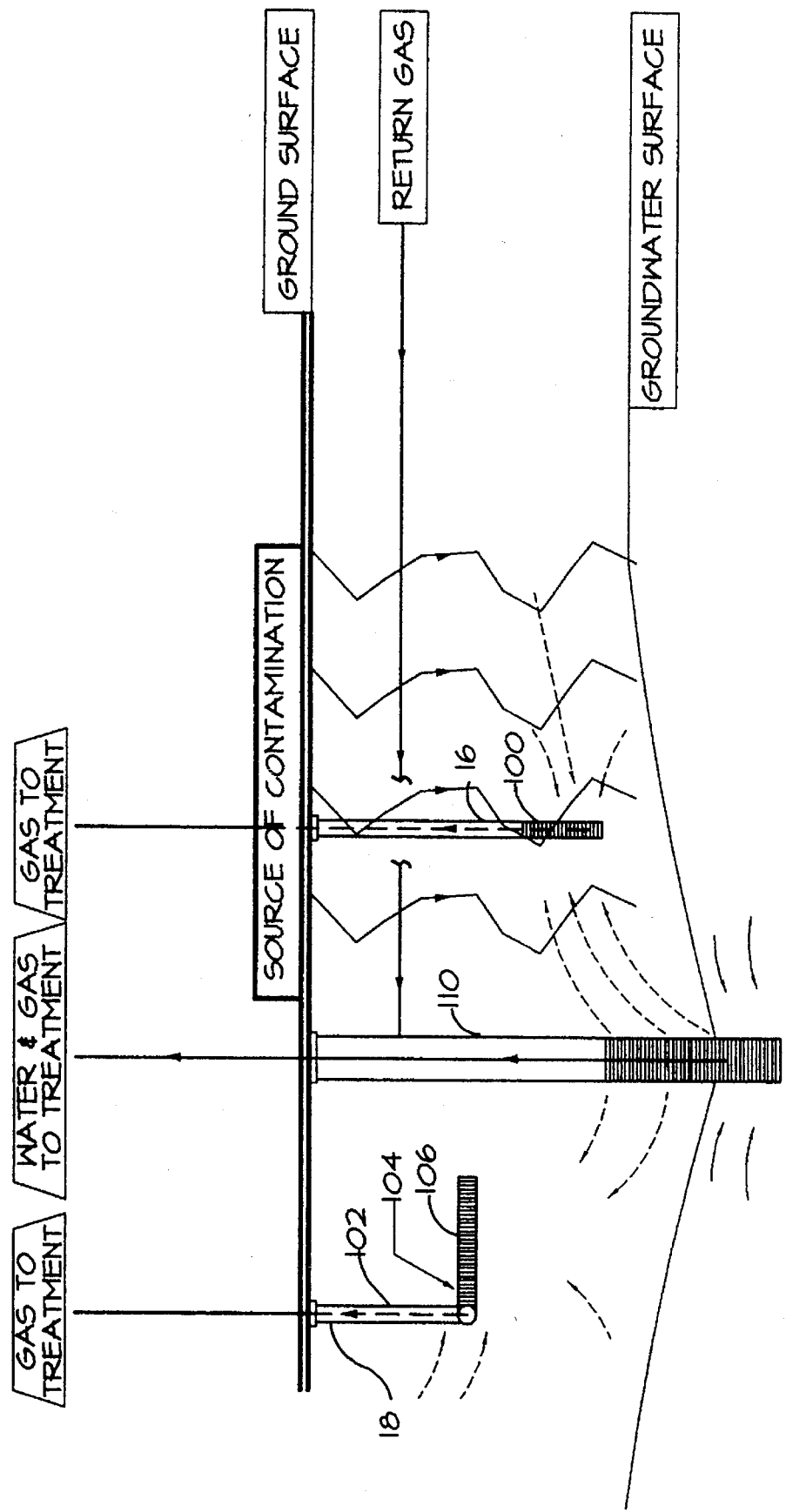
FIG. 4 is a schematic side elevational view showing a somewhat modified pressure extraction well and vent well system employing the process of the present invention.

Referring to FIG. 4, it can be seen that separate vent wells 16 and 18 can be employed for venting gas that has been introduced into the soil from the area. Vent wells can operate under vacuum conditions, or preferably, provide a near-atmospheric vent to the gas treatment mechanism or to atmosphere. Vent well 16 is a conventional vertical vent pipe having perforations 100 at the lower end, whereas vent well 18 has a vertical pipe 102 and a horizontal vent pipe 104 that has vent openings 106 similar to that used in the other pipes. The advantage of a horizontal vent is that it can receive vent soil gas from a larger horizontal area with less vacuum requirements than a vertical vent well. Gas vented from pipe 110 (which can be the same as pipe 26) migrates to vent wells 16 and 18 and then is directed out of the well to a gas treatment mechanism.

As shown in FIGS. 2 and 5, the horizontal conduits conveying gas (e.g., return air) and conveying gas to the treatment mechanism can either be above ground (as shown in FIG. 2) or below ground (as shown in FIG. 5).

Figure 3:
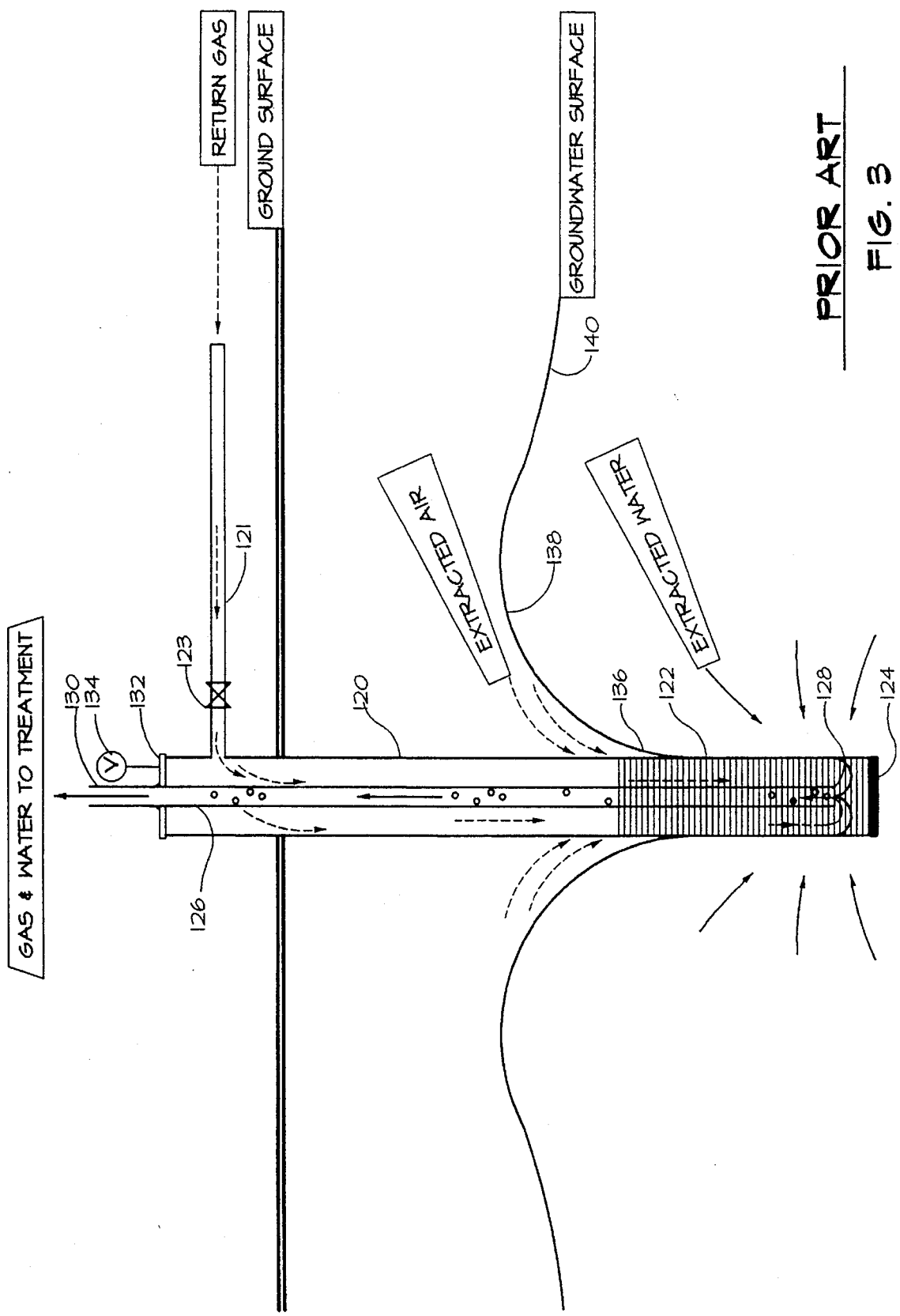
FIG. 3 is a schematic side elevational view showing the operation of a vacuum extraction well, co-extracting soil vapor and groundwater.

The present invention is contrasted with a prior art vacuum extraction process shown in FIG. 3. As shown in FIG. 3, an exterior pipe 120 having perforated openings 122 at the lower end and having a bottom 124 has an interior pipe 126 extending from an open lower end 128 to an outlet 130 at an upper end. A cap 132 on the exterior pipe encloses the upper end of that pipe. A vacuum gauge 134 can be placed to measure the amount of vacuum in the exterior pipe.

In the operation of a vacuum system, a substantial vacuum of up to 26 inches of mercury is developed at outlet 130. This creates a vacuum in exterior pipe 120 and causes air in the vicinity of the openings in pipe 120 to migrate into exterior pipe 120. Water also migrates into exterior pipe 120. The vacuum then draws water droplets and vapor and gas upwardly through opening 128 into lift pipe 126 and out of the system. The operation of this type of device is significant in several respects. First, high vacuum levels can create an upward bulge 138 in the groundwater surface that extends above the static groundwater surface level at the point of vacuum application. Groundwater extraction using exterior pipe 120 will depress the groundwater immediately adjacent the exterior of the pipe, as shown by portion 136. The reduced pressure in the vadose zone above the groundwater surface at least partially offsets this effect by urging the groundwater upwardly. There is a concern that the vacuum that induces upwelling could, under some circumstances, exceed the depression effect caused by groundwater extraction, in which case the groundwater would actually rise to form a raised collar or bulge in the groundwater surface around the well casing (see FIG. 3). Thus, contaminants floating on the groundwater on the outer side of the bulge 140 are allowed to flow under gravity away from the vacuum extraction pipe. Immersion of capillary soils by vacuum-induced groundwater upwelling will ultimately retard volatization and aerobic decomposition activity in the vicinity of the pipe, due to the absence of gaseous contact. Any vacuum-induced upwelling conflicts with objectives of contaminant extraction including surface contour reduction, contaminant volatilization and soil venting.

The present invention provides soil venting, an increased vadose and capillary area for improved contaminant removal, an improved groundwater contour leading to the extraction pipe and an improved liquid and gas removal action.

It should be understood that the foregoing represents merely an exemplary embodiment of the preferred practice of the present invention and that various changes and modifications may be made in the arrangements and details of construction of the embodiments disclosed herein without departing from the spirit and scope of the present invention as defined in the appended claims.

I claim:

1. A process for removal of underground contaminants from a soil area that includes a vadose zone above a groundwater unit having a normal groundwater surface, comprising:

providing an extraction well that extends downwardly below the normal groundwater surface, the well including an exterior pipe with fluid permeable openings therein at a lower portion that extends below the normal groundwater surface;

providing an interior pipe inside the exterior pipe, the interior pipe having an inlet opening below the normal groundwater surface;

maintaining gas flow from the exterior pipe into the inlet of the interior pipe and then upwardly and out of the well;

maintaining a gas pressure in the exterior pipe that is sufficient to cause gas to flow outwardly through the exterior pipe openings into the soil in the vadose zone as it may be expanded by the operation of the process, the gas pressure in the exterior pipe being sufficiently low that liquid flows from the groundwater unit into the exterior pipe to the inlet of the interior pipe and is then conveyed by the flowing gas out of the well through the interior pipe;

the exterior pipe having gas permeable openings at an upper portion of the pipe spaced above the openings in the lower portion, with the openings in the upper and lower portions of the pipe being isolated from each other, the gas being introduced into the lower portion of the exterior pipe, the pressure in the upper portion of the pipe being maintained at a sufficiently lower level than the pressure in the lower portion that gas injected into the underground soil through the lower portion openings in induced to pass into the upper portion of the exterior pipe through the openings in the upper portion, the gas in the upper portion of the exterior pipe thereafter being conveyed from the well through an outlet in the upper portion of the exterior pipe.

2. A process for removal of underground contaminants from a soil area that includes a vadose zone above a groundwater unit having a normal groundwater surface, comprising:

providing an extraction well that extends downwardly below the normal groundwater surface, the well including an exterior pipe having a lower portion that extends below the normal groundwater surface to a lower end, the exterior pipe having at least one fluid permeable opening in the lower portion or lower end thereof at a position below the normal groundwater surface, the exterior pipe having at least one fluid permeable opening therein at a position adjacent the vadose zone above the level of a depressed groundwater surface;

providing an interior pipe inside the exterior pipe, the interior pipe having an inlet opening below the normal groundwater surface;

creating and maintaining a gas flow through the exterior pipe to the inlet of the interior pipe and then upwardly in the interior pipe and out of the well;

maintaining at first a gas pressure in the exterior pipe at a level that induces groundwater flow to the interior pipe inlet, and then maintaining the pressure at a pressure exceeding soil gas pressure, such that gas is induced to flow outwardly through the exterior pipe opening adjacent the vadose zone, venting the soil and creating a depressed groundwater surface surrounding the well; and maintaining a gas pressure in the lower portion of the exterior pipe that is sufficiently low in comparison with the hydraulic pressure in the groundwater unit opposite the inlet to the interior pipe that liquid outside the exterior pipe is urged to flow into the exterior pipe to the inlet of the interior pipe, such that the liquid is conveyed upwardly out of the interior pipe by the gas flowing up the interior pipe.

3. A process according to claim 2 and further comprising:

separating liquid from gas components in fluids conveyed out of the well through the interior pipe; and treating the gas or liquid components or both as necessary to remove contaminants therefrom.

4. A process according to claim 3 wherein the treated gas is thereafter reintroduced into the exterior pipe of the well as pressurized gas.

5. A process according to claim 2 wherein the gas contains oxygen.

6. A process according to claim 2 wherein the gas comprises air.

7. A process according to claim 2 wherein the pressure of the gas in the exterior pipe is greater than zero (0) and up to about forty (40) psig adjacent the lower portion of the exterior pipe.

8. A process according to claim 7 wherein the pressure in the interior pipe is less than forty (40) psig.

9. A process according to claim 8 wherein the pressure in the interior pipe is less than twenty (20) psig.

10. A process according to claim 8 wherein the pressure in the interior pipe adjacent the inlet opening is less than two (2) psig.

11. A process according to claim 2 wherein the pressure of the gas in the exterior pipe is greater than zero (0) and up to about twenty (20) psig adjacent the lower portion of the exterior pipe.

12. A process according to claim 2 wherein the pressure of the gas in the exterior pipe is about two (2) psig adjacent the lower portion of the exterior pipe.

13. A process according to claim 2 and further comprising at least one vent well spaced apart from the extraction well, the vent well venting subsurface gas to an outlet that leads out of the vent well.

14. A process according to claim 13 wherein the vent well pressure is about one atmosphere or lower.

15. A process according to claim 14 wherein the vent well pressure is about one atmosphere pressure.

16. A process according to claim 2 wherein the gas contains oxygen and the pressure in the exterior pipe is maintained at a level in excess of the soil gas pressure in the vadose zone surrounding the exterior pipe openings for at least a portion of the extraction process, such that pressurized gas is injected from the exterior pipe into the vadose zone, the pressurized gas depressing the groundwater surface surrounding the well while at the same time oxygenating the soil and vaporizing volatile contaminants in the soil.

17. A process according to claim 16 wherein the gas pressure in the exterior pipe is maintained at levels that are at least increased to two (2) psig during the extraction process.

18. A process according to claim 2 wherein the openings in the exterior pipe extend upwardly to a point where the soil outside uppermost openings lies in the vadose zone at least after the process has been operated for a period of time.

19. A process according to claim 18 wherein the openings in the exterior pipe extend above the normal groundwater surface prior to operation of the process.

20. A process according to claim 19 wherein the openings in the exterior pipe extend above the normal groundwater surface, and further comprising a movable blocking means in the exterior pipe for selectively closing at least a portion of the openings above the groundwater surface to adjust the rate of gas flow into the soil in the vadose zone.

21. A process for removal of underground contaminants from a soil area that includes a vadose zone above a groundwater unit having a normal groundwater surface, comprising:

providing an extraction well that extends downwardly below the groundwater surface, the well including an exterior pipe with fluid permeable openings therein at a lower portion that extend below the normal groundwater surface, the openings extending upwardly above the normal groundwater surface or at least sufficiently close to the normal groundwater surface that the introduction of pressurized gas in the exterior pipe at a predetermined pressure in excess of the ambient soil gas pressure causes gas to flow outwardly from the exterior pipe through at least the uppermost openings therein into an area surrounding the well that is or becomes part of the vadose zone through operation of the process;

providing an interior pipe inside the exterior pipe, the interior pipe having an inlet opening below the normal groundwater surface;

maintaining a positive gas pressure in the exterior pipe that is sufficiently high to cause gas to flow into the soil through at least uppermost openings in the exterior pipe, the gas pressure being low enough that the gas pressure in the exterior pipe does not prevent water from flowing into the exterior pipe from the groundwater unit to the inlet opening in the interior pipe; and maintaining a gas flow from the exterior pipe into the inlet of the interior pipe and then upwardly and out of the well, such that liquid is conveyed by the flowing gas out of the well through the interior pipe.

22. A process according to claim 21 wherein water extraction is continued while gas is injected into the expanded vadose zone, the combined effect of groundwater removal and gas injection serving to expand the vadose zone while at the same time removing contaminated groundwater.

23. A process for removal of underground contaminants from a contamination site wherein contaminants extend downwardly from a normal groundwater surface into a groundwater unit, comprising:

extracting contaminated water from an area of contaminated groundwater beneath the normal groundwater surface at a rate that causes a depression of the groundwater surface below its normal level at the point of extraction, such action producing an area of expanded vadose zone above the depressed groundwater surface and below the normal groundwater surface; and injecting gas into the expanded vadose zone so as to permeate the expanded vadose zone soil and increase the soil gas pressure in the expanded vadose zone, the increased soil gas pressure urging further depression of the groundwater surface and creating a larger expanded vadose zone for remediation by gas injection.

24. A process for removing underground contaminants from a contamination site wherein the contaminants are present in the groundwater to a predetermined depth below a normal groundwater surface, the process comprising:

establishing a well that extends downwardly below the normal groundwater surface by at least said predetermined depth, the well having an exterior pipe with fluid permeable openings in at least a portion of the exterior pipe below the normal groundwater surface;

extracting groundwater from the well at a rate that causes a depression of the groundwater surface below the normal groundwater surface, creating an expanded vadose zone below the normal groundwater surface; and establishing a flow of gas into the vadose zone, as expanded, through at least certain of the exterior pipe openings so as to increase soil gas pressure and further depress the groundwater surface and expand the vadose zone, the gas flow and groundwater extraction being sufficient to depress the groundwater surface around the well to the predetermined depth.

* * * * *